(12) United States Patent
Carlsen et al.

(10) Patent No.: US 10,632,404 B2
(45) Date of Patent: Apr. 28, 2020

(54) GREASE FILTER AND METHOD OF USE

(71) Applicant: Siemens Gamesa Renewable Energy A/S, Brande (DK)

(72) Inventors: Peter Kaufmann Carlsen, Billund (DK); Ulrich Hedegaard Madsen, Børkop (DK); Henrik Gyldenlev Mortensen, Vildbjerg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 15/696,222

(22) Filed: Sep. 6, 2017

(65) Prior Publication Data
US 2018/0126308 A1 May 10, 2018

(30) Foreign Application Priority Data
Nov. 4, 2016 (DE) .......................... 10 2016 221 685

(51) Int. Cl.
| | | |
|---|---|---|
| *B01D 35/06* | (2006.01) | |
| *F03D 80/70* | (2016.01) | |
| *B03C 1/30* | (2006.01) | |
| *F16N 39/06* | (2006.01) | |
| *B03C 1/28* | (2006.01) | |
| *F01M 1/10* | (2006.01) | |

(52) U.S. Cl.
CPC .............. *B01D 35/06* (2013.01); *B03C 1/286* (2013.01); *B03C 1/30* (2013.01); *F03D 80/70* (2016.05); *F16N 39/06* (2013.01); *B03C 2201/18* (2013.01); *F01M 2001/1042* (2013.01)

(58) Field of Classification Search
None
See application file for complete search history.

(56) References Cited

U.S. PATENT DOCUMENTS 2,149,764 A * 3/1939 Frei ....................... B03C 1/0332
209/215
2,419,764 A    4/1947 Cassell
(Continued)

FOREIGN PATENT DOCUMENTS

| CA | 2753111 A1 | 3/2012 |
|---|---|---|
| CN | 103968226 A | 8/2014 |

(Continued)

OTHER PUBLICATIONS

SU1768231 (machine translation), English) (Aug. 10, 2019).*

(Continued)

*Primary Examiner* — Chester T Barry
(74) *Attorney, Agent, or Firm* — Schmeiser, Olsen & Watts LLP

(57) ABSTRACT

A grease filter for filtering grease and the use of the grease filter for a bearing in a wind turbine is provided. A grease filter is disclosed for filtering grease used for lubrication. The grease filter includes and inlet to allow the grease to enter the filter and an outlet to allow the grease to leave the filter, whereby the grease flows from the inlet towards the outlet along a flow path. The filter includes at least one magnetic element present in the flow path of the grease to attract magnetic particles present in the grease and deviate the particles out of the grease flow path.

14 Claims, 3 Drawing Sheets

(56) References Cited

U.S. PATENT DOCUMENTS

| | | | | |
|---|---|---|---|---|
| 2,820,528 | A | * | 1/1958 | Harper .................... F16N 33/00 |
| | | | | 184/1.5 |
| 3,900,400 | A | | 8/1975 | Whitfield |
| 3,954,611 | A | | 5/1976 | Reedy |
| 5,228,990 | A | | 7/1993 | Chiang |
| 5,655,366 | A | * | 8/1997 | Kawamura ........... F01N 3/0212 |
| | | | | 55/487 |
| 5,817,233 | A | | 10/1998 | Cooper |
| 5,932,108 | A | * | 8/1999 | Brunsting .............. B01D 35/06 |
| | | | | 184/6.25 |
| 6,093,318 | A | * | 7/2000 | Saho ....................... B03C 1/027 |
| | | | | 209/223.1 |
| 6,706,178 | B2 | * | 3/2004 | Simonson ............... B01D 35/06 |
| | | | | 210/222 |
| 6,743,365 | B1 | | 6/2004 | Marlowe |
| 9,527,089 | B2 | * | 12/2016 | Yount .................. B03C 1/0332 |
| 2003/0116494 | A1 | * | 6/2003 | Elsegood ................ B03C 1/286 |
| | | | | 210/222 |
| 2014/0144827 | A1 | * | 5/2014 | Marchand ............ B03C 1/0332 |
| | | | | 210/222 |
| 2014/0314569 | A1 | * | 10/2014 | Michaud ................. F03D 15/10 |
| | | | | 416/1 |
| 2016/0138358 | A1 | * | 5/2016 | Whitby ............... E21B 33/0355 |
| | | | | 166/363 |

FOREIGN PATENT DOCUMENTS

| | | |
|---|---|---|
| CN | 204494043 U | 7/2015 |
| CN | 104930338 A | 9/2015 |
| DE | 3783487 T2 | 5/1993 |
| EP | 3112626 A1 | 1/2017 |
| JP | H05149122 A | 6/1993 |
| JP | H069984 A | 1/1994 |
| SU | 1768231 A1 * | 10/1992 |

OTHER PUBLICATIONS

European Extended Search Report dated Mar. 27, 2018; Application No. 17186787.2.
Non-English Chinese Office Action dated Jan. 22, 2019 for Application No. 201711069795.1.

* cited by examiner

GREASE FILTER AND METHOD OF USE

CROSS-REFERENCE TO RELATED APPLICATION

This application claims priority to German application No. 10 2016 221 685.6 having a filing date of Nov. 4, 2016, the entire contents of which are hereby incorporated by reference.

FIELD OF TECHNOLOGY

The following relates to a grease filter for filtering grease and the use of the grease filter for a bearing in a wind turbine.

BACKGROUND

Bearings are lubricated by oil or grease, for example. The lubricant is stored in a reservoir and is from there transported to the bearing. The used lubricant leaves the bearing.

The lubricant needs to be pure enough to avoid damages in the bearing by impurities or particles.

Impurities, like particles of different kind, can cause severe damage to the bearing. The live-time of the bearing is reduced or the bearing is damaged in a way that it can no longer be used and needs to be replaced.

Depending on the type of bearing, and the use of the bearing, the costs of the exchange of a bearing can be extremely high. For example, in the case of a bearing used as a main bearing in an offshore wind turbine, the exchange of the bearing requires the use of a ship and a crane to detach the rotor of the wind turbine and replace the bearing.

Thus damages to the bearing, and thus an early exchange of the bearing, need to be avoided. Therefore impurities, like for examples particles in the lubricant for the bearings need to be avoided.

Particles are sometimes present in the lubricant as it is delivered read to be used. In addition, on the way from the reservoir to the bearing, the lubricant might get impure by dust and particles from the pump or the conduits.

It is known to filter oil, to remove impurities and particles. Oil can easily be forced through a filter, as its viscosity is low enough to allow filtering. The viscosity of grease is higher which makes filtering of grease difficult.

SUMMARY

An aspect relates to an arrangement and method to remove impurities from grease.

A grease filter is disclosed for filtering grease used for lubrication, whereby the grease filter comprises an inlet to allow the grease to enter the filter and an outlet to allow the grease to leave the filter. The grease flows from the inlet towards the outlet along a flow path.

The filter comprises at least one magnetic element present in the flow path of the grease to attract magnetic particles present in the grease and deviate the particles out of the grease flow path.

Grease is often used for lubrication for bearings, for example. The grease is delivered in a clean state ready to be used for lubrication. Nevertheless, magnetic or non-magnetic particles might be present in the grease or might be added to the grease as impurities by particles present in the ducts, valves or similar.

The particles in the grease are transported towards the item that should be lubricated, for example a bearing. It might there cause damage. Damages in a bearing reduce the lifetime of the bearing and lead to higher costs due to an early exchange of the bearing.

Thus, it is advantageous to eliminate impurities like particles from the grease before the grease is used for lubrication.

The grease filter described has an inlet and an outlet to allow the grease to enter and to leave the filter. The grease flows from the inlet of the filter to the outlet which defines a direction of the grease flow and a grease flow path.

At least one magnetic element is present in the grease flow path. The magnetic element attracts magnetic particles that are present in the grease that flows by the magnetic element.

The magnetic particles are attracted by the magnetic element and are so deviated out of the grease flow. The magnetic particles are attracted by the magnetic element and come to a rest at the magnetic element are closed-by.

Thus, magnetic elements present in the grease flow that enters the filter are deviated out of the grease flow and are held back in the grease filter by the magnetic element.

Thus, the grease leaving the filter at the outlet side is cleaned from magnetic particles. Thus, magnetic particles are filtered out of the grease and cannot enter a device to be lubricated, like a bearing, for example.

Thus, the lifetime of the bearing is increased and the costs for service and maintenance of the bearing, or even the exchange of the bearing, are reduced.

The filter comprises at least two magnetic elements that are spaced apart from each other by a spacer. The grease filter comprises at least two magnetic elements that are arranged in a way that they are present close to the flow path or in the flow path of the grease flowing through the filter.

The magnetic elements, or magnets, attract magnetic particles present in the grease and deviate them out of the grease flow. The magnetic particles are attracted by the magnets and are held back by the magnets due to magnetic force.

The two magnetic elements present in the grease filter are spaced apart by a spacer. Thus, a certain predefined magnetic field can develop in the space between the two magnetic elements that is defined by the spacer.

Thus, the effect of the magnetic elements on the magnetic particles in the grease flow is increased.

The two magnetic elements present in the filter can be arranged in the direction of the grease flow, so that the grease passes one magnetic element after the other.

Or two magnetic elements can be arranged vertical to the grease flow, so that the grease flow passes by a pair of magnets with the distance between the magnets being vertical to the flow path of the grease.

The filter comprises at least three magnets arranged mainly along the flow path of the grease and spaced apart by a spacer present between two neighboring magnets, whereby the two spacers comprise a different length.

The distance between a first and a neighboring second magnet differs from the distance between the second and the neighboring third magnet. Three magnetic elements are arranged in a row along the flow path of the grease.

The magnets are spaced apart by spacers. The spacer between the first and the second magnet has a different length than the spacer between the second and the third magnet. Thus, the distance between the first and the second magnet differs from the distance between the second and the third magnet.

Thus, the magnetic field that develops between the first and the second magnet, differs from the magnetic field that is present between the second and the third magnet.

The magnetic field can be influenced by the length of the spacer. Thus, the form and strength of the magnetic field can be designed by using a spacer of a certain length.

Thus, the effect of the filter on magnetic particles can be optimized by designing spacers of a certain predetermined length.

In addition, the effect of the filter on magnetic particles of different sizes can be optimized by using spacers with a different length.

A magnetic element comprises a through-going hole to allow the grease to flow through the hole in the magnetic element.

The magnetic element in the grease filter comprises a hole, and the grease flow path leads through the hole in the magnetic element. Thus, the grease flow leads through the magnetic element and the grease flow crossing the magnetic element is surrounded by the magnetic element.

Thus, the contact surface between the magnetic element and the grease that flows by the magnetic element, is optimized and thus, the effect of the magnetic element on magnetic particles in the grease flow is increased.

The magnetic element is ring-shaped and the grease flow is oriented mainly in the direction of the middle axis of the ring-shaped magnetic element. The magnetic element is ring-shaped and thus, is adapted to a flow path of the grease with a circular shape.

The grease filter can be designed with a round shape to adapt to hoses and pipes used for the grease flow.

A magnetic element comprises a north pole and a south pole characterized in that at least two magnetic elements are arranged in a way that the equal poles of the magnetic elements face the flow direction of the grease flow.

The strength and the direction of the magnetic field present in the grease filter depend on the arrangement of the magnetic elements within the filter.

The magnetic element comprises a north pole and a south pole for at least two magnetic elements in the filter, are arranged in the way that either both north poles of the magnetic elements or both south poles of the magnetic elements face the flow direction of the grease flow.

Thus, the magnetic field present in the filter can be designed in a way to suit the needs.

In another embodiment of the invention a magnetic element comprises a north-pole and a south-pole characterized in that the magnetic elements are arranged in a way that unequal poles of consecutive magnetic elements face the flow direction of the grease flow.

The magnetic elements are arranged in the way that unequal poles of the magnets face the direction of the grease flow.

Thus equal poles of neighboring magnetic elements face each other. Thus the form in the strength of the magnetic field present in the filter can be designed in a way to optimize the effect of the filter.

The grease filter comprises a mesh filter stage, whereby the grease flow is directed through the mesh of the filter and whereby the mesh comprises a certain predetermined mesh width to filter particles of a certain particle size from the grease flow.

In addition to the filter stage with the magnetic elements, the grease filter comprises a filter stage with mesh filter. The mesh of the mesh filter stage comprises a certain predetermined mesh width to filter particles above a certain size from the grease flow.

While the filter stage with the magnetic elements filters magnetic particles out of the grease flow, non magnetic particles and magnetic particles, that were not sorted out by the magnetic elements, can be filtered out of the grease flow by the mesh.

They are held back by the mesh in the mesh filter stage and it thus eliminated from the grease flow. Thus the grease flow is cleaned from non-magnetic and magnetic particles of a certain size or larger.

To enable the grease to flow through the mesh of the mesh filter stage, the grease filter can be equipped with a heating element, to increase the temperature of the grease. This lowers the viscosity of the grease and makes the grease flow though the mesh filter stage more easily and quicker.

The filter comprises at least two mesh filter stages spaced apart by a spacer.

The grease flow is directed through to consecutive mesh filter stages in the filter. The meshes of the mesh filter stages are spaced apart by a spacer. Thus the filter effect of the mesh filter stage is increased, as particles that pass the first mesh filter stage by accident can be held back at a second mesh filter stage.

In addition, in the case of a failure in one of the mesh filter stages the other mesh filter stage is still present in the grease flow and allows particles to be filtered out of the grease flow.

At least two mesh filter stages have different mesh width, whereby the mesh width of the filter stages decreases in the direction of the flow of the grease in the filter.

At least two mesh filter stages are arranged in the grease flow. The grease flowing through the filter passes one mesh filter stage after the other.

At least two of the mesh filter stages have a different mesh width. The mesh width defines the size of a particle which is filtered out of the grease flow. Particles of a certain size or larger are held back by a mesh with a certain predetermined mesh width.

Thus the filter can be designed in a way that different mesh filters stages hold back particles of different sizes. Thus the filter effect of the mesh filter stages can be optimized.

The filter comprises an end filter mesh close to the outlet of the filter as a safety filter to hold back particles and parts of the filter in case of a failure of the filter.

The grease filter comprises an end filter mesh close to the outlet of the filter. The end filter mesh is designed to hold back particles or parts of the filter stages before, that might can lose in the filter due to the failure of one of the filter stages.

In case of a failure of one of the mesh filter stages a mesh might break and release a huge amount of particles into the grease flow. In addition, even pieces of the mesh of the mesh filter stage might be carried along by the grease flow.

The end filter mesh is arranged close to the outlet of the filter and is designed to hold back particles or lose parts that are carried along by the grease flow. Thus, in the case of a failure, particles and parts of the filter are hindered to leave the grease filter.

The flow of the grease through the grease filter first passes by the at least one magnetic element and thereafter passes through the at least one mesh filter stage.

The grease filter comprises an inlet and an outlet to allow the grease to enter and to leave the filter. Between the inlet and the outlet a flow pass of the grease is defined.

The filter stages in the grease filter are arranged in a way that the grease flow is first directed past the at least one magnetic element, and the thereafter the grease flow through the mesh filter stage.

Thus magnetic particles are first filtered out of the grease flow and thereafter non-magnetic particles are filtered out of the grease flow by the mesh filter stage.

Thus the load on the mesh filter stage is decreased as magnetic particles are already held back by the magnets. The mesh filter stage only needs to hold back the non-magnetic particles.

The at least one magnetic element and the at least one mesh filter stage are arranged in a common housing, that is covered at least at one of the inlet end or the outlet end by a lid to allow service and maintenance of the grease filter.

The filter stages of the grease filter are arranged in a common housing. The common housing of the grease filter comprises the at least one magnetic element and the at least one mesh filter stage.

The grease filter comprises an inlet and an outlet to allow the grease to enter and to leave the filter. Thus the common housing also needs to comprise an inlet and an outlet.

At least at one side of the filter, the inlet side or the outlet side, the common housing comprises a lid that allows to open the filter, and thus allows to perform service and maintenance at the filter stages of the grease filter.

The inlet side of the housing of the grease filter comprises a lid to allow service and maintenance of the at least one magnetic element and the outlet side of the housing of the grease filter comprises a lid to allow service and maintenance of the at least one mesh filter stage.

The at least one magnetic element of the magnetic filter stage of the grease filter, and the at least one mesh filter stage of the non-magnetic filter stage of the grease filter are arranged in the common housing.

The common housing comprises an inlet side and an outlet side. The inlet side of the grease filter comprises a lid to allow access to the at least one magnetic element.

Thus service and maintenance can be performed at a magnetic filter stage and at least one magnetic element. The lid at the inlet side of the common housing can be opened, for example, to remove the magnetic element and to clean the filter.

The outlet side of the common housing of the grease filter comprises a lid that allows the access to the mesh filter stages.

Thus service and maintenance is possible to be performed at the mesh filter stages. The lid at the outlet and of the common housing of the grease filter can be opened and the mesh filter stage can be removed and cleaned.

The use of a grease filter is disclosed, whereby the grease filter is used for the lubrication of a bearing of a wind turbine.

Wind turbines comprise big bearings that are often lubricated by grease. The bigger bearings in a wind turbine are a main bearing of a direct driven wind turbine, for example, or blade pitch bearings.

The bigger bearings in a wind turbine are difficult to be exchanged, and thus the exchange of a bearing is very expensive. Thus it is very important to increase the life time of a bearing.

By filtering the grease use for lubrication of the bearing the lifetime of the bearing can be increased, and additional costs for the exchange of a bearing can be avoided. Thus the overall costs of energy of a wind turbine can be decreased.

BRIEF DESCRIPTION

Some of the embodiments will be described in detail, with reference to the following figures, wherein like designations denote like members, wherein.

DETAILED DESCRIPTION

Figure 1:
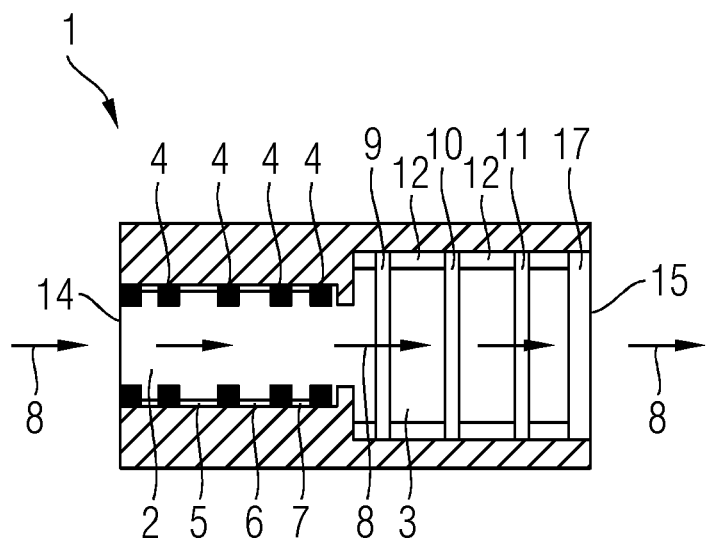
FIG. 1 shows a grease filter, in accordance with embodiments of the present invention.

FIG. 1 shows a grease filter.

FIG. 1 shows a grease filter 1. The grease filter 1 comprises an inlet 14, where the oil can flow into the grease filter 1, and an outlet 15, where the grease leaves the grease filter. The direction of the grease flowing through the grease filter 1, from the inlet 14 to the outlet 15, defines a flow direction 8 of the grease.

In the flow direction 8 of the grease the grease filter 1 comprises a metal filter 2 and a non-metal filter 3. The metal filter 2 magnetic particles present in the grease are filtered out of the grease flowing through the filter.

To filter the magnetic particles out of the grease the grease filter 2 comprises magnetic elements 4. The magnetic elements 4, or magnets, are arranged close to, or in, the flow path of the grease. Metal particles present in the grease flowing through the filter are attracted by the magnetic elements 4, and are thus sorted out of the grease flow by the magnets.

At least one magnet or magnetic element 4 is necessary to filter magnetic parts out of the grease. In FIG. 1 four magnets 4 are shown. The magnets 4 are separated by spacers that allow the magnets 4 to be arranged in a certain distance to each other.

In the embodiment of FIG. 1 a first spacer 5 comprises a different length than a second spacer 6. Thus, the first and second magnetic elements 4 are arranged at a different distance in respect to each other than a second and a third magnetic element.

Thus, the magnets 4 arranged in the metal filter 2 of the grease filter 1 are not evenly distributed within the filter. The magnets 4 are not evenly spaced throughout the filter 2 along the flow path of the grease.

In the embodiment of FIG. 1 the first spacer 5 is dimensioned in a way to lead to a longer distance between the first and the second magnet than the spacer 6, so that the magnets 4 are arranged with decreasing distances between each other.

A spacer 7 between the third and the fourth magnet might even lead to a smaller distance between the third and the fourth magnet than between the second and the third magnet.

While the magnets 4 reach into the grease flow and are surrounded by grease at three sides, the spacers between the magnets are set back from the main grease flow to achieve a little bay between the magnets. Particles of magnetic material that are attracted by the magnets 4, deviate from the main grease flow 8 towards the magnets and get to rest in the bays between the magnets.

Along the main grease flow direction 8 the grease leaving the metal filter 2 flows into the non-metal filter 3.

In the embodiment of FIG. 1 the non-metal filter 3 comprises several stages of mesh. In the non-metal filter 3 non-magnetic particles are filtered out of the grease flow. In addition, also magnetic particles that were not held back by the magnetic elements in the metal filter stage will be held back by the mesh.

The different stages of mesh can show a different width of the mesh to sort out particles of different size from the grease flow. Thus, the first mesh stage 9 can, for example, show a width of the mesh of 500 micrometers. The first stage of the mesh 9 is separated from the second stage of the mesh 10 by a spacer 12.

The second stage of the mesh 10 can have a mesh width of 250 micrometers, for example. The second stage of the mesh 10 is separated from the third stage of the mesh 11 by a spacer 12 again.

The third stage of the mesh 11 can have a width of the mesh of 125 micrometers, for example. The non-metal filter 3 can be equipped with more or less than three stages of mesh.

At the outlet 15 of the filter 1, there is a rough end filter mesh 17 as a safety filter in the case of a failure of one of the mesh stages before. The rough end filter mesh 17 can be designed stronger to hold back mesh stages or parts of mesh stages of the meshes in the filter.

Figure 2:
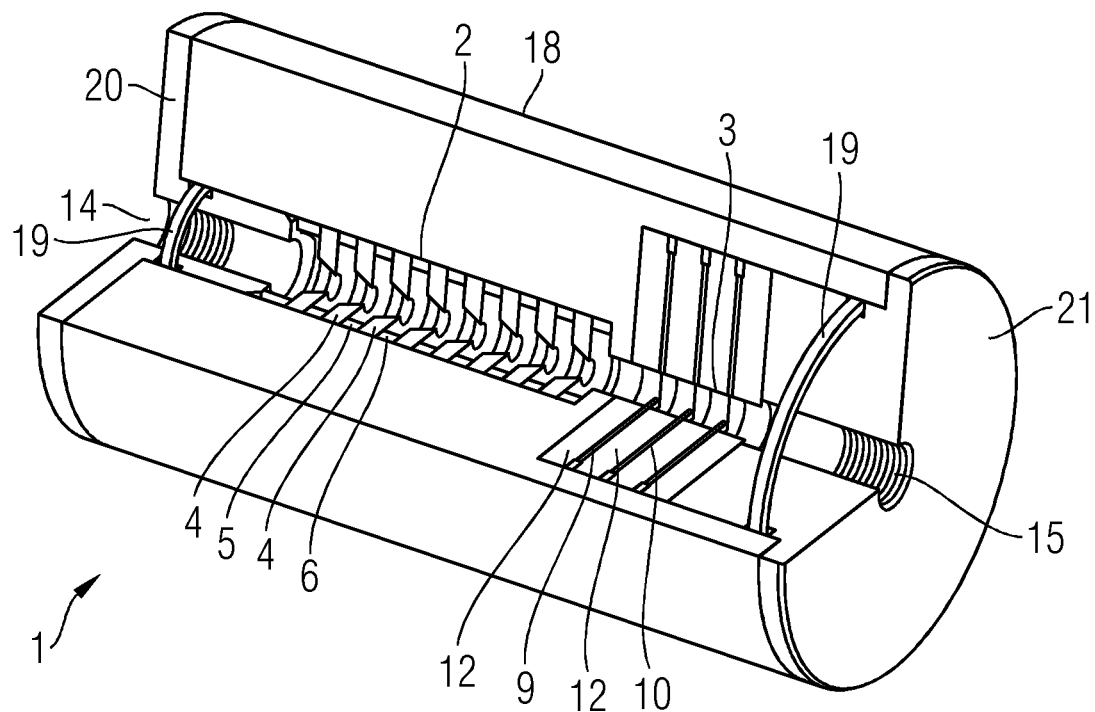
FIG. 2 shows a grease filter in more detail, in accordance with embodiments of the present invention.

FIG. 2 shows a grease filter in more detail.

FIG. 2 shows a grease filter 1 with a metal filter 2 from magnetic particles and a non-metal filter 3 for non-magnetic particles.

The two filter stages are arranged in a filter cover unit 18. The filter cover unit 18 is equipped with an inlet lid 20 at the inlet 14. The inlet lid 20 is sealed towards the filter cover unit 18 with an O-ring 19.

In addition, the grease filter 1 is equipped with an outlet lid 21 at the outlet 15 of the filter. Also the outlet lid 21 can be sealed towards the filter cover unit 18 with an O-ring 19.

Both the inlet lid 20 and outlet lid 21 are equipped with a thread to connect conduits for the grease to be supplied to and from the filter.

The lids 20, 21 can be detached from the filter cover unit 18 to allow the grease filter 1 to be disassembled and cleaned. Thus, the different filter stages within the metal filter 2 and the non-metal filter 3 can be disassembled from the filter 1 and can be cleaned.

Magnetic and non-magnetic particles held back in the filter can be removed from the filter stages.

The metal filter 2 shows several stages of magnetic elements or magnets 4 spaced apart from each other by spacers 5, 6.

The magnets 4 might be arranged equally distanced in respect to each other or in another embodiment the spacers 5, 6 might be of different length leading to an unequal distribution of the magnets in the filter.

The non-metal filter shows mesh stages 9, 10 whereby the mesh stages might be equipped with a mesh of different mesh width, especially with a decreasing mesh width from one mesh stage to the next.

The mesh stages 9, 10 of the non-metal filter 3 are spaced apart by spacers 12.

Figure 3:
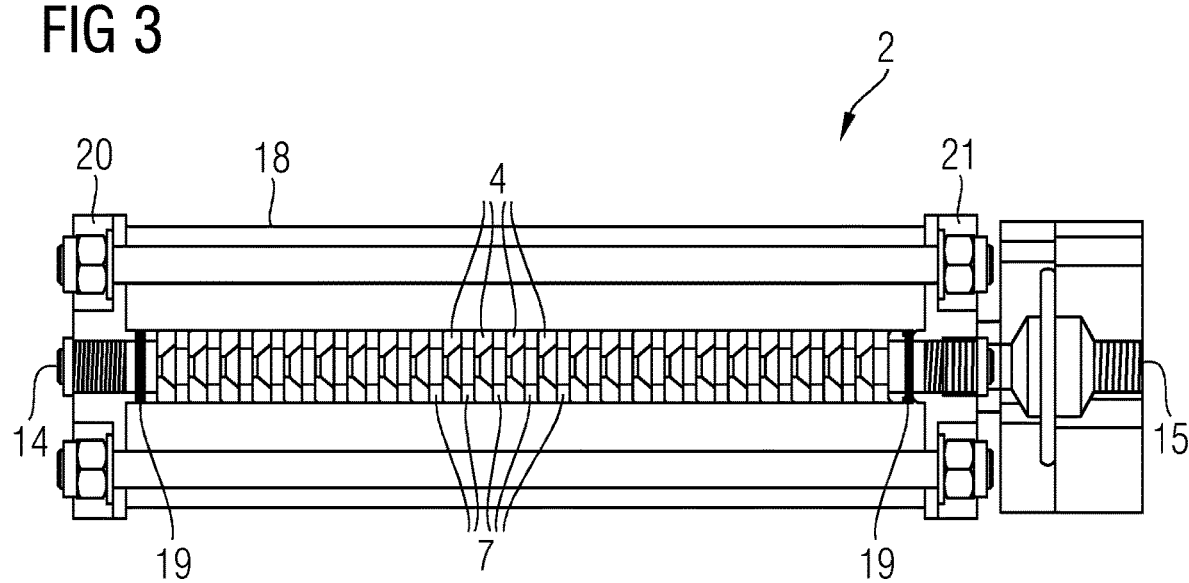
FIG. 3 shows a grease filter with one stage, in accordance with embodiments of the present invention.

FIG. 3 shows a grease filter 1 with one stage.

FIG. 3 shows a grease filter 1 with a stage for magnetic particles only. The grease filter 1 comprises a metal filter 2 comprising magnets 4.

The metal filter 2 in FIG. 3 comprises a filter cover unit 18 that comprises an inlet lid 20 with an inlet opening 14. At the outlet side the filter cover unit 18 comprises an outlet lid 21 with an outlet 15.

At the outlet side of the metal filter 2, the filter can be connected to a non-metal filter if necessary. The lids 20, 21, are sealed towards the filter cover unit by O-rings 19.

The metal filter 2 comprises several stages of magnets 4 that are spaced apart by spacers 7. The magnets 4 attract magnetic particles present in the grease flowing through the filter. The magnetic particles interact with the magnetic field of the magnetic elements and deviate out of the grease flow. The magnetic particles attach to the magnets 4, or come to rest at the spacers 7.

The inlet lid 20, the outlet lid 21 and the filter cover unit 18 are connected by screws or bowls. The connection can be released and the filter can be opened to be cleaned.

The stages of magnets 4 and spacers 7 can be removed from the filter cover unit 18 and can be cleaned from the magnetic particles resting on the magnets 4 or the spacers 7.

Figure 4:
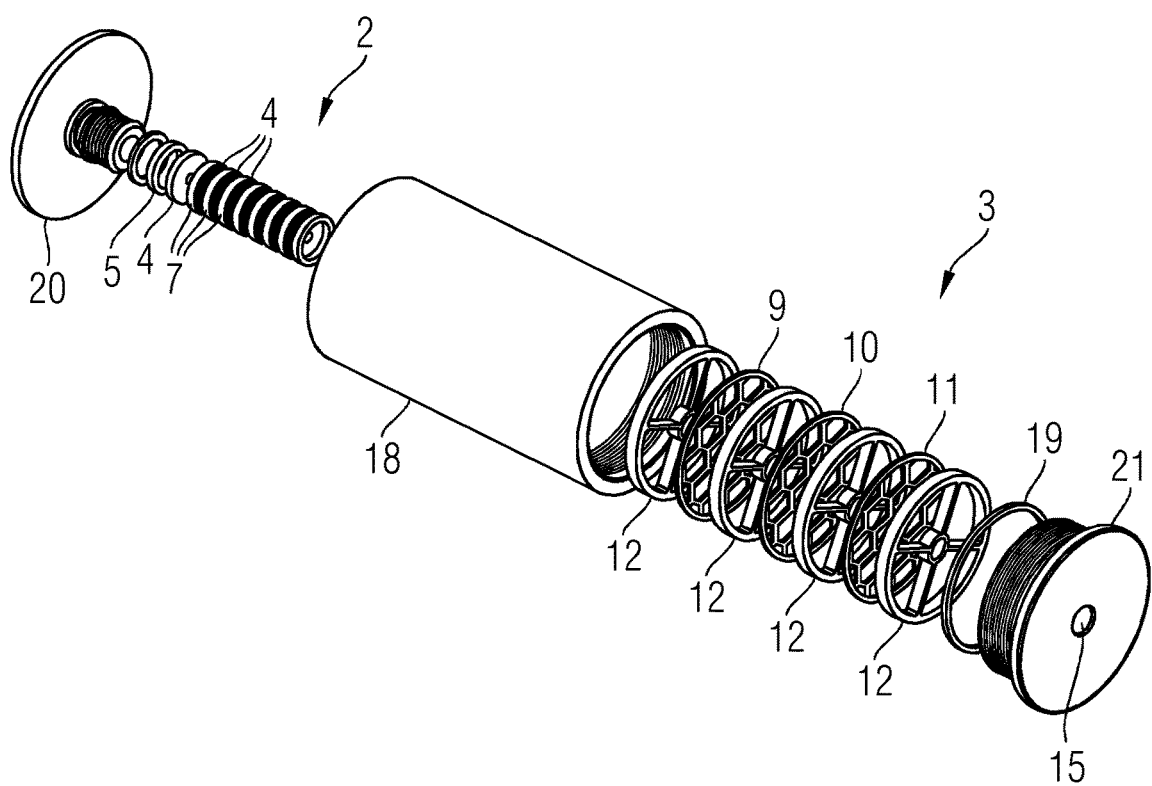
FIG. 4 shows an explosive view of the grease filter, in accordance with embodiments of the present invention.

FIG. 4 shows an explosive view of the grease filter.

FIG. 4 shows an explosive view of the grease filter 1 with a metal filter 2 and a non-metal filter 3. The metal filter 2 comprises several stages of magnets 4, spaced apart from each other by spacers 7.

The non-metal filter 3 comprises stages of mesh 9, 10, 11 that are spaced apart from each other by spacers 12.

The metal filter 2 and the non-metal filter 3 are arranged in a filter cover unit 18. The filter cover unit is closed by an inlet lid 20 and an outlet lid 21.

The grease flows from an inlet opening in the inlet lid 20 through the metal filter 2. Thereafter, through the non-metal filter 3 and leaves the grease filter 1 at an outlet opening 15 in an outlet lid 21.

The inlet lid 20 and the outlet lid 21 are sealed by an O-ring 19 to avoid the loss of grease.

The inlet lid 20 can be removed from the filter cover unit 18 to allow access to the magnets 4 and the spacers 7 of the metal filter 2 for service and maintenance.

Also the outlet lid 21 can be removed for service and maintenance of the mesh stages 9, 10, 11 and the spacers 12 of the non-metal filter 3.

As shown in FIG. 4, the magnets 4 have a ring-shaped form allowing the grease to flow through the middle hole in the magnets.

The outlet lid 21 comprises a threat at the outlet 15 to allow a conduit for the grease to be connected to the outlet lid.

Figure 5:
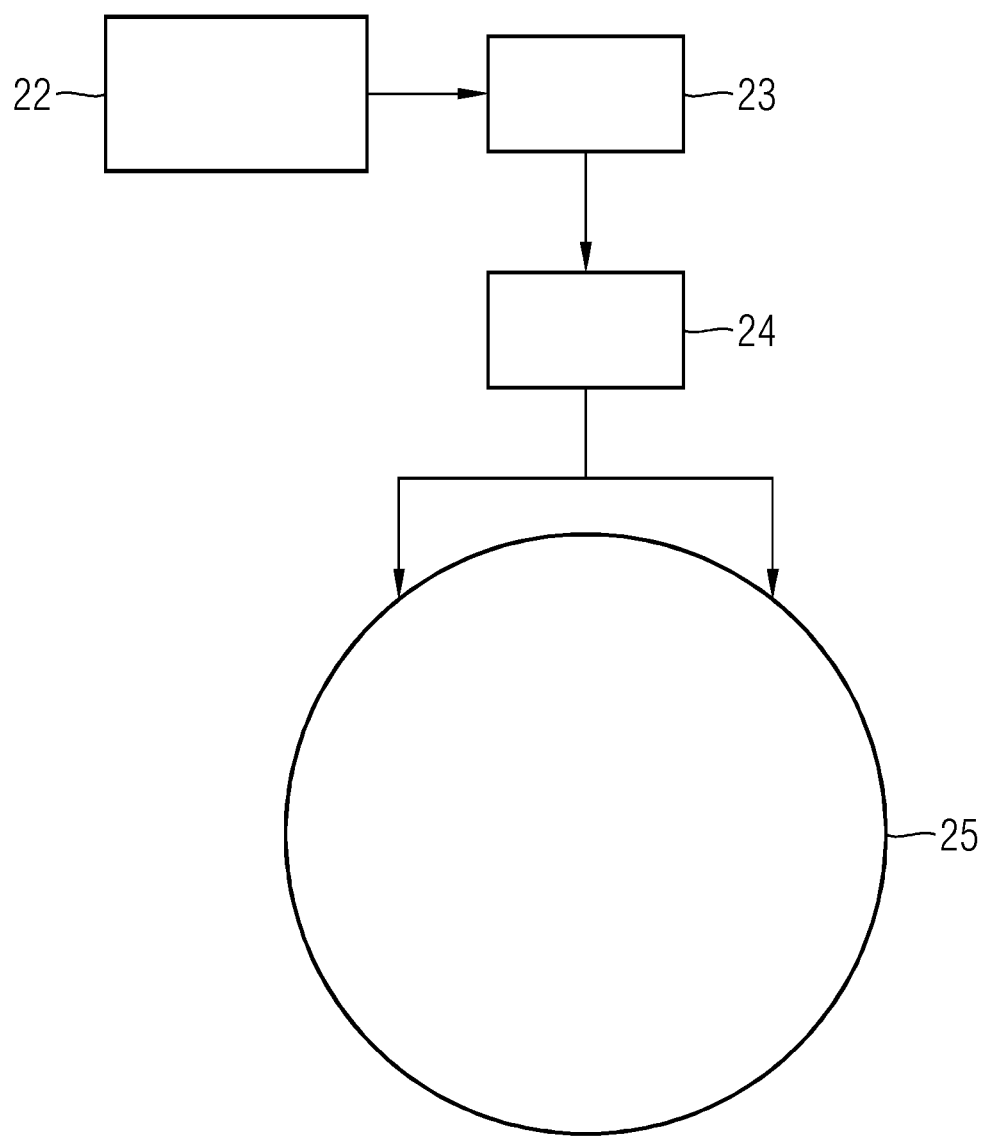
FIG. 5 shows an arrangement with the filter, in accordance with embodiments of the present invention.

FIG. 5 shows an arrangement with the filter.

FIG. 5 shows a block diagram with the grease filter 23. The grease is used to lubricate a bearing 25.

The grease is supplied by a grease reservoir and the grease pump 22. The grease is then pumped through the grease filter 23 to remove magnetic and non-magnetic particles from the grease.

Thereafter, the grease flows through a distribution block 24, where the grease is distributed to different lubrication inlets at the bearing 25.

The illustration in the drawings is in schematic form. It is noted that in different figures, similar or identical elements are provided with the same reference signs.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A grease filter for filtering grease used for lubrication, comprising:
   an inlet to allow the grease to enter the grease filter;
   an outlet to allow the grease to leave the grease filter, whereby the grease flows from the inlet towards the outlet along a central flow path; and
   a plurality of pairs of co-axial magnetic elements each having a central opening forming the central flow path of the grease, the pairs of co-axial magnetic elements being configured to attract magnetic particles present in the grease and deviate the magnetic particles out of the grease from the central flow path and into a bay formed between the pairs of co-axial magnetic elements.

2. The grease filter according to claim 1, further a spacer disposed between each of the pairs of co-axial magnetic elements.

3. The grease filter according to claim 1, wherein the plurality of pairs of co-axial magnetic elements includes at least three magnetic elements arranged mainly along the flow path of the grease, and spaced apart by a spacer present between two neighboring magnetic elements, whereby the two spacers comprise a different length, so that a distance between a first magnetic element and a neighboring second magnetic element differs from a distance between the neighboring second magnetic element and a neighboring third magnetic element.

4. The grease filter according to claim 1, wherein the magnetic elements are ring shaped and the grease flow is oriented mainly in a direction of a middle axis of the ring shaped magnetic element.

5. The grease filter according to claim 2, wherein the magnetic elements comprise a north pole and a south pole, such that that the pairs of co-axial magnetic elements are arranged in a way that the equal poles of the magnetic elements face the flow direction of the grease flow.

6. The grease filter according to claim 2, whereby the magnetic elements comprise a north pole and a south pole, wherein the magnetic elements are arranged in a way that unequal poles of consecutive magnetic elements face the flow direction of the grease flow.

7. The grease filter according to claim 1, further comprising a mesh filter stage, whereby the grease flow is directed through a mesh of the filter, and whereby the mesh comprises a certain predetermined mesh width to filter particles of a certain particle size from the grease flow.

8. The grease filter according to claim 7, wherein at least two mesh filter stages are spaced apart by a spacer.

9. The grease filter according to claim 8, wherein the at least two mesh filter stages each have a different mesh width, whereby the mesh width of the filter stages decreases in the direction of the flow of the grease in the filter.

10. The grease filter according to claim 1 further comprising an end filter mesh close to the outlet of the grease filter, as safety filter to hold back particles and parts of the grease filter in case of a failure of the grease filter.

11. The grease filter according to claim 7, wherein the flow of grease through the grease filter first passes by the pairs of co-axial magnetic elements, and thereafter passes through the at least one mesh filter stage.

12. The grease filter according to claim 1, wherein the pairs of co-axial magnetic elements and at least one mesh filter stage are arranged in a common housing, that is covered at least at one of the inlet end or the outlet end by a lid to allow service and maintenance of the grease filter.

13. The grease filter according to claim 12, wherein the inlet side of the housing of the grease filter comprises a lid to allow service and maintenance of the magnetic elements, and the outlet side of the housing of the grease filter comprises a lid to allow service and maintenance of the at least one mesh filter stage.

14. A method comprising:
   utilizing a grease filter according to claim 1, to filter grease used for the lubrication of a bearing in a wind turbine.

* * * * *